W. H. BOWMAN.
ARTIFICIAL TOOTH.
APPLICATION FILED OCT. 30, 1916.
1,269,521.
Patented June 11, 1918.
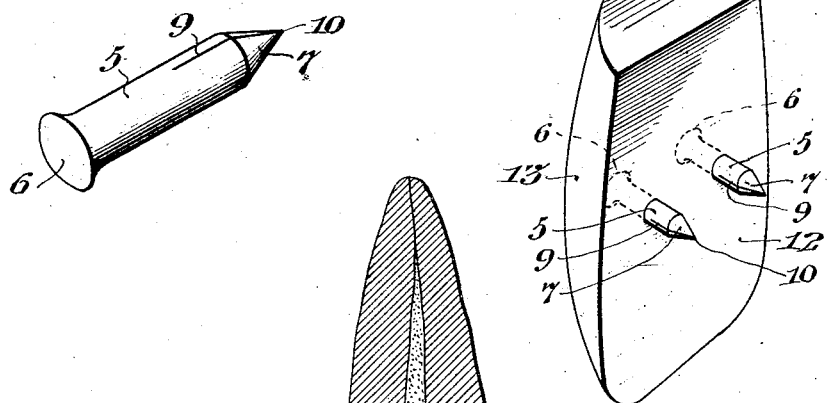
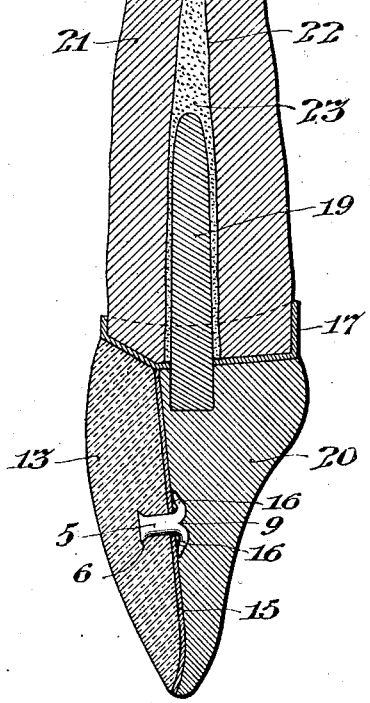
Witness
Edward F. Simpson, Jr.
Inventor
Walter H. Bowman,
By Clifton C. Hallowes
Attorney

UNITED STATES PATENT OFFICE.

WALTER H. BOWMAN, OF PHILADELPHIA, PENNSYLVANIA, ASSIGNOR TO THE S. S. WHITE DENTAL MANUFACTURING COMPANY, A CORPORATION OF PENNSYLVANIA.

ARTIFICIAL TOOTH.

1,269,521.

Specification of Letters Patent.

Patented June 11, 1918.

Application filed October 30, 1916. Serial No. 128,405.

*To all whom it may concern:*

Be it known that I, WALTER H. BOWMAN, a citizen of the United States, and a resident of the city of Philadelphia, in the county of Philadelphia, State of Pennsylvania, have invented certain new and useful Improvements in Artificial Teeth, of which the following is a specification, reference being had to the accompanying drawings.

My invention relates particularly to that class of artificial teeth that are arranged to be connected with their mountings by pins or projections extending from their lingual faces, and is especially directed to the form of such pins.

Teeth of this class are generally provided with platinum pins, which, as is well known, will withstand the intense heat in firing the porcelain body, and such pins must be of such length as to permit of their being bent over a backing plate upon which the mounting may be built.

The principal objects of my invention are, to provide a tooth attaching pin that will cheapen the cost of production of artificial teeth, yet provide ample strength and efficiency for their attachment to the backing or support.

Other objects of my invention are, to provide a tooth attaching pin that may be readily manipulated to securely attach the porcelain tooth body to its backing without danger of fracturing or in any way injuring said tooth body.

Specifically stated, the form of my invention as hereinafter described provides a tooth attaching pin having one end split axially, and affording opposed prongs which may be passed through a backing and separated by bending oppositely to secure the tooth body and backing together.

My invention also includes all of the various novel features of construction and arrangement as hereinafter more definitely specified.

In the accompanying drawing, Figure 1 is a perspective view of a tooth attaching pin constructed in accordance with my invention; Fig. 2 is a perspective view of an artificial tooth facing conveniently embodying pins such as is shown in Fig. 1; and Fig. 3 is a vertical longitudinal sectional view showing the tooth facing shown in Fig. 2, backed and mounted, thereby illustrating a practical application of my invention.

In said figures, the pin 5, which is preferably formed of cylindrical wire, has the head 6 and sharpened end 7, which is preferably conical but which may be wedge shaped if so desired.

As best shown in Figs. 1 and 2, the pointed or sharpened end of the pin 5 is provided with a slit 9 extending from the point 10 toward the head 6 and terminating considerably short thereof at a region somewhat exteriorly beyond the lingual face 12 of the porcelain tooth body 13 in which the headed end of the pin is fired, as shown in Fig. 2.

The porcelain tooth body provided with pins constructed in accordance with my invention, may be readily secured to the backing plate 15, shown in Fig. 3, and preferably formed of gold, by forcing the sharpened split end of the pins 5 through said plate and then separating the opposed prongs 16 by bending them oppositely from each other and against said backing plate 15 in the manner illustrated in Fig. 3.

The porcelain tooth facing body thus backed may then be united with its mounting, comprising the collar 17 and post 19, by flowing molten solder in contact therewith to form the backing body 20.

The tooth structure thus formed may be readily connected with the natural tooth root 21, by forcing the post 19 into the root canal 22 into which a suitable retaining substance such as cement 23 has been inserted.

It is to be understood the mounting herein shown and described is merely illustrative of a convenient application of a tooth facing having attaching pins constructed in accordance with my invention, and that such a tooth facing thus equipped may be variously applied in such as bridge or plate work, etc.

It will be obvious that a tooth attaching pin constructed in accordance with my invention will, when forced through the backing plate 15, have its prongs 16 forced together and to all intents and purposes act as, and afford substantially the same strength as, a solid unsplit pin.

It may be here noted that tooth facings having pins as heretofore constructed were subject to fracture by the bending of the pin, by reason of the respective tension and compression of the metal at the opposite sides of the pin in the plane of its distortion.

My invention is advantageous in that the pin 5 having the slit 9 terminating exteriorly beyond the region of intersection of the lingual face of the tooth body, prevents any strain upon the porcelain, for the reason that the bending action is entirely free from the porcelain. Furthermore, the portion of the pin to be bent is divided, so that the compression due to the bending action is distributed upon the opposite sides of the pin while the tension is effected along the medial axis. This also permits a material shortening of the pin and a consequent saving of precious metal.

It will also be noted that by terminating the slit 9 exteriorly beyond the lingual face of the tooth body, the bending of the prongs of the pin oppositely, tends to upset or distort the metal at the region of the inner termination of said slit, which fills the pierced aperture in the tooth backing and affords a seal therefor, thereby preventing the soldering flux from passing through said aperture into contact with the porcelain tooth facing. This, it will be noted, is highly advantageous as it is well known that the soldering flux if permitted to contact with the porcelain will deleteriously check it and render the tooth facing unfit for use.

I do not desire to limit my invention to the precise details of construction and arrangement as herein set forth, as it is obvious that various modifications may be made therein without departing from the essential features of my invention as defined in the appended claim.

Having thus described my invention, I claim:

A pin for attaching a tooth facing to a metal backing, arranged to have one end integrally embedded in the body of said tooth facing and the other end sharpened and provided with an axial slit having its inner end terminating within that portion of said pin which is adapted to project beyond the tooth body, and affording relatively bendable prongs complementary to pierce the backing plate of said tooth, and arranged to be bent away from each other to clench said plate and tooth together, the region of distortion of said prongs being limited by the inner termination of said slot, to a position exterior to the tooth body.

In witness whereof, I have hereunto set my hand this 11th day of October, A. D., 1916.

WALTER H. BOWMAN.

Witnesses:
WILLIAM J. RUSSELL,
CLIFTON C. HALLOWELL.

Copies of this patent may be obtained for five cents each, by addressing the "Commissioner of Patents, Washington, D. C."